US009008948B2

(12) United States Patent
Machida

(10) Patent No.: US 9,008,948 B2
(45) Date of Patent: Apr. 14, 2015

(54) FUEL INJECTION CONTROL APPARATUS FOR A VEHICLE, AND METHOD OF USING SAME

(75) Inventor: Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1128 days.

(21) Appl. No.: 12/321,277

(22) Filed: Jan. 16, 2009

(65) Prior Publication Data

US 2009/0192695 A1 Jul. 30, 2009

(30) Foreign Application Priority Data

Jan. 28, 2008 (JP) ................................ 2008-016242

(51) Int. Cl.

*F02D 41/20* (2006.01)
*G06F 7/00* (2006.01)
*F02M 51/00* (2006.01)
*G01M 15/00* (2006.01)
*F02D 41/22* (2006.01)

(52) U.S. Cl.

CPC .............. *F02D 41/221* (2013.01); *F02D 41/20* (2013.01); *F02D 2041/2093* (2013.01)

(58) Field of Classification Search

CPC ............ F02D 41/20; F02D 2041/2072; F02D 2041/2075; F02D 2041/2082; F02D 2041/2093

USPC .................. 701/103; 123/478, 479, 480, 490; 324/522; 361/88, 187; 73/114.01, 73/114.45

See application file for complete search history.

(56) References Cited

U.S. PATENT DOCUMENTS 5,469,825 A * 11/1995 Golab et al. .................. 123/479
5,678,521 A * 10/1997 Thompson et al. ........... 123/447
5,939,797 A * 8/1999 Konno et al. ................ 307/10.3
6,591,816 B2 * 7/2003 McCoy et al. ................ 123/490
6,759,851 B2 * 7/2004 Hazelton ........................ 324/522
7,107,976 B2 * 9/2006 Gu ................................ 123/644
7,681,558 B2 * 3/2010 Gale et al. ..................... 123/557
2006/0054375 A1 * 3/2006 Kakinuma .................... 180/282
2008/0180069 A1 * 7/2008 Sato ................................ 322/27

FOREIGN PATENT DOCUMENTS

JP 9-151768 A 6/1997
JP 2000-130236 A 5/2000
JP 3735380 B 10/2005

* cited by examiner

*Primary Examiner* — Stephen K Cronin
*Assistant Examiner* — David Hamaoui
(74) *Attorney, Agent, or Firm* — Carrier Blackman & Associates, P.C.; Joseph P. Carrier; Jeffrey T. Gedeon

(57) ABSTRACT

A fuel injection control apparatus includes a low-side driver, arranged electrically downstream of an injector and operable to drive the injector with a changeover of an ON-OFF state thereof in response to a drive signal from a CPU; a high-side driver, arranged electrically upstream of the injector and downstream of a power source, and having an ON-OFF state thereof which may be changed in response to the drive signal from the CPU; a high-side return signal detection unit and a low-side return signal detection unit. Each of the low-side and high-side drivers includes a transistor arranged inside an ECU. The CPU diagnoses a function of a drive circuit based on the presence or non-presence of return signals received from the high-side return signal detection unit and the low-side return signal detection unit with respect to predetermined driving states of both the low-side and high-side drivers.

3 Claims, 3 Drawing Sheets

| | HIGH-SIDE DRIVER | LOW-SIDE DRIVER | HIGH-SIDE RETURN SIGNAL | LOW-SIDE RETURN SIGNAL |
|---|---|---|---|---|
| ①HIGH-SIDE DRIVER DIAGNOSIS | OFF | OFF | NON-PRESENCE | (NON-PRESENCE) |
| ②INJECTOR DIAGNOSIS A | ON | OFF | (PRESENCE) | NON-PRESENCE |
| ②INJECTOR DIAGNOSIS B | ON | ON | (PRESENCE) | PRESENCE |

FIG. 3

| | HIGH-SIDE DRIVER | LOW-SIDE DRIVER | HIGH-SIDE RETURN SIGNAL | LOW-SIDE RETURN SIGNAL |
|---|---|---|---|---|
| ①HIGH-SIDE DRIVER DIAGNOSIS | OFF | OFF | NON-PRESENCE | (NON-PRESENCE) |
| ②INJECTOR DIAGNOSIS A | ON | OFF | (PRESENCE) | NON-PRESENCE |
| ②INJECTOR DIAGNOSIS B | ON | ON | (PRESENCE) | PRESENCE |

FUEL INJECTION CONTROL APPARATUS FOR A VEHICLE, AND METHOD OF USING SAME

CROSS-REFERENCE TO RELATED APPLICATIONS

The present application claims priority under 35 USC §119 based on Japanese patent application No. 2008-016242, filed on Jan. 28, 2008. The entire subject matter of this priority document, including specification, claims and drawings, is incorporated by reference herein.

BACKGROUND OF THE INVENTION

1. Field of the Invention

The present invention relates to a fuel injection control apparatus for an internal combustion engine of a battery-less vehicle, and to a method of using same. More particularly, the present invention relates to a fuel injection control apparatus, which is operable to interrupt a supply of electricity to an injector drive system when a short-circuit occurs in the injector drive system, and at the same time, which can enhance startability of an engine of a battery-less vehicle.

2. Description of the Background Art

There is known fuel injection device which drive an injector having a fuel injection valve in response to a drive signal from a central processing unit (CPU) arranged inside an engine control unit (ECU). Such a fuel injection control apparatus requires a fail-safe function for preventing a continued supply of electricity to the injector when a circuit of an injector driving system is short-circuited by a chance, such as, due to some malfunctioning thereof.

An example of a known fuel injection control apparatus is disclosed in the Japanese Patent No. 3735380. The fuel injection control apparatus disclosed in the Japanese Patent No. 3735380 includes a relay switch arranged between a power source and an injector. When a circuit of an injector drive system is short-circuited, the relay switch is turned off so as to interrupt the supply of electricity to the injector driving system.

However, when the fuel injection control apparatus disclosed in the Japanese Patent No. 3735380 is applied to a battery-less vehicle, a relay switch having a mechanical drive portion is interposed between the AC generator and the injector. In the battery-less vehicle, an injector is driven using electricity generated by an AC generator which is rotated by a kick starter or the like at the time of starting an engine.

Hence, a time necessary for supplying electricity to the injector at the time of starting the engine is prolonged. Accordingly, there is a possibility that the startability of the engine is lowered. Further, with the configuration of the fuel injection control apparatus disclosed in the Japanese Patent No. 3735380, when a trouble such as sticking occurs in the relay switch, per se, the occurrence of such a trouble cannot be detected.

The present invention has been made to overcome such drawbacks of the existing fuel injection control apparatus. Accordingly, it is an object of the present invention to provide a fuel injection control apparatus which is operable interrupt the supply of electricity to an injector drive system when a short-circuit occurs, and at the same time, which can enhance the startability of an engine of a battery-less vehicle.

SUMMARY OF THE INVENTION

In order to achieve the above-mentioned objects, the present invention according to a first aspect thereof provides a fuel injection control apparatus for operating an injector using a CPU arranged inside an ECU. The fuel injection control apparatus includes a low-side driver arranged electrically downstream of the injector; and a high-side driver arranged electrically upstream of the injector and downstream of a power source. The low-side driver is configured to drive the injector with a changeover of an ON-OFF state thereof in response to a drive signal received from the CPU. The high-side driver is configured to change over an ON-OFF state thereof in response to the drive signal received from the CPU. The low-side driver and the high-side driver are each formed of a transistor. The transistors of the low-side driver and the high-side driver are arranged inside the ECU.

The present invention according to a second aspect thereof, in addition to the first aspect, provides the fuel injection control apparatus having a high-side return signal detection circuit (also referred as a high-side return signal detection unit) arranged downstream of the high-side driver and upstream of the injector, and a low-side return signal detection circuit (also referred as a low-side return signal detection unit) arranged upstream of the low-side driver and downstream of the injector. A return signal outputted from the high-side return signal detection unit, and a return signal outputted from the low-side return signal detection unit are each respectively inputted to the CPU.

The present invention according to a third aspect thereof is characterized in that the CPU diagnoses that the high-side driver is functioning a normal manner when a return signal is not outputted from the high-side return signal detection unit in a state that the high-side driver is turned off and the low-side driver is turned off.

The present invention according to a fourth aspect thereof is characterized in that the CPU diagnoses that an internal circuit of the injector is not in a ground-short-circuited state when a return signal is not outputted from the low-side return signal detection unit in a state that the high-side driver is turned on and the low-side driver is turned off.

The present invention according to a fifth aspect thereof is characterized in that the CPU diagnoses that the internal circuit of the injector is not in an open state when a return signal is outputted from the low-side return signal detection unit in a state that the high-side driver is turned on and the low-side driver is turned on.

The present invention according to a sixth aspect thereof is characterized in that the fuel injection control apparatus is used for a motorcycle, and a fuel pump for supplying fuel to the injector is directly connected to the power source of the motorcycle.

Advantages of the Invention

According to the first aspect of the present invention, the fuel injection control apparatus includes the low-side driver arranged electrically downstream of the injector, and is configured to drive the injector with a changeover of an ON-OFF state thereof in response to a drive signal from the CPU; the high-side driver arranged electrically upstream of the injector and downstream of the power source, and is configured to change over an ON-OFF state thereof in response to a drive signal from the CPU; and the low-side driver and the high-side driver are each respectively formed of a transistor, and are arranged inside the ECU.

Due to such configuration of fuel injection control apparatus, electricity can be supplied to the injector more quickly compared to a method which supplies electricity to the injector via a relay having a mechanical drive component. Accordingly, in a vehicle which does not include a vehicle-mounted battery (e.g., a battery-less vehicle), and which uses electricity generated by the AC generator rotated by a person (e.g., an operator of the vehicle) by operating a kick starter or the like, at the time of starting an engine as a driving power source of the injector, it is possible to enhance the startability of the engine without delaying the supply of electricity to the injector.

Further, in a vehicle in which a fuel pump is directly connected to the driving power source, even when a circuit of the injector driving system is short-circuited, by changing over the high-side driver to an OFF state, it is possible to interrupt the supply of electricity to the injector driving system. Further, since the low-side driver and the high-side driver are each formed of the transistor, and are arranged inside the ECU, the miniaturization of the driving circuit of the injector can be realized.

According to the second aspect of the present invention, the fuel injection control apparatus includes the high-side return signal detection unit arranged downstream of the high-side driver and upstream of the injector; and the low-side return signal detection unit arranged upstream of the low-side driver and downstream of the injector. A return signal outputted from the high-side return signal detection unit and a return signal outputted from the low-side return signal detection unit are respectively inputted to the CPU. Hence, the CPU can perform a diagnosis of functions of the high-side driver, the low-side driver and the injector by detecting two return signals.

According to the third aspect of the present invention, the CPU diagnoses that the high-side driver functions normally when the return signal is not outputted from the high-side return signal detection unit in a state that the high-side driver is turned off and the low-side driver is turned off. Hence, by detecting presence or non-presence of the return signals with respect to the driving states of the high-side driver and the low-side driver, it is possible to easily detect whether or not the high-side driver is in a normal functional state.

According to the fourth aspect of the present invention, the CPU diagnoses that the internal circuit of the injector is not in a ground-short-circuited state when a return signal is not outputted from the low-side return signal detection unit in a state that the high-side driver is turned on and the low-side driver is turned off. Hence, it is possible to easily detect that the internal circuit of the injector is not in a ground-short-circuiting state, which may occur due to sticking or the like.

According to the fifth aspect of the present invention, the CPU diagnoses that the internal circuit of the injector is not in an open state when the return signal is outputted from the low-side return signal detection unit in a state that the high-side driver is turned on and the low-side driver is turned on. Hence, it is possible to easily detect that the internal circuit of the injector is not held in an open state which occurs due to sticking or the like.

According to the sixth aspect of the present invention, the fuel injection control apparatus is used for the motorcycle. The fuel pump for supplying fuel to the injector is directly connected to the power source of the motorcycle. Accordingly, for a vehicle which does not include a vehicle-mounted battery and uses electricity, as the driving power source of the injector, generated by the AC generator rotated by operating the kick starter or the like at the time of starting the engine, it is possible to enhance the startability of the engine without delaying the supply of electricity to the fuel pump.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a table showing outputs of return signals during the diagnosis processing of the FI drive circuit.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
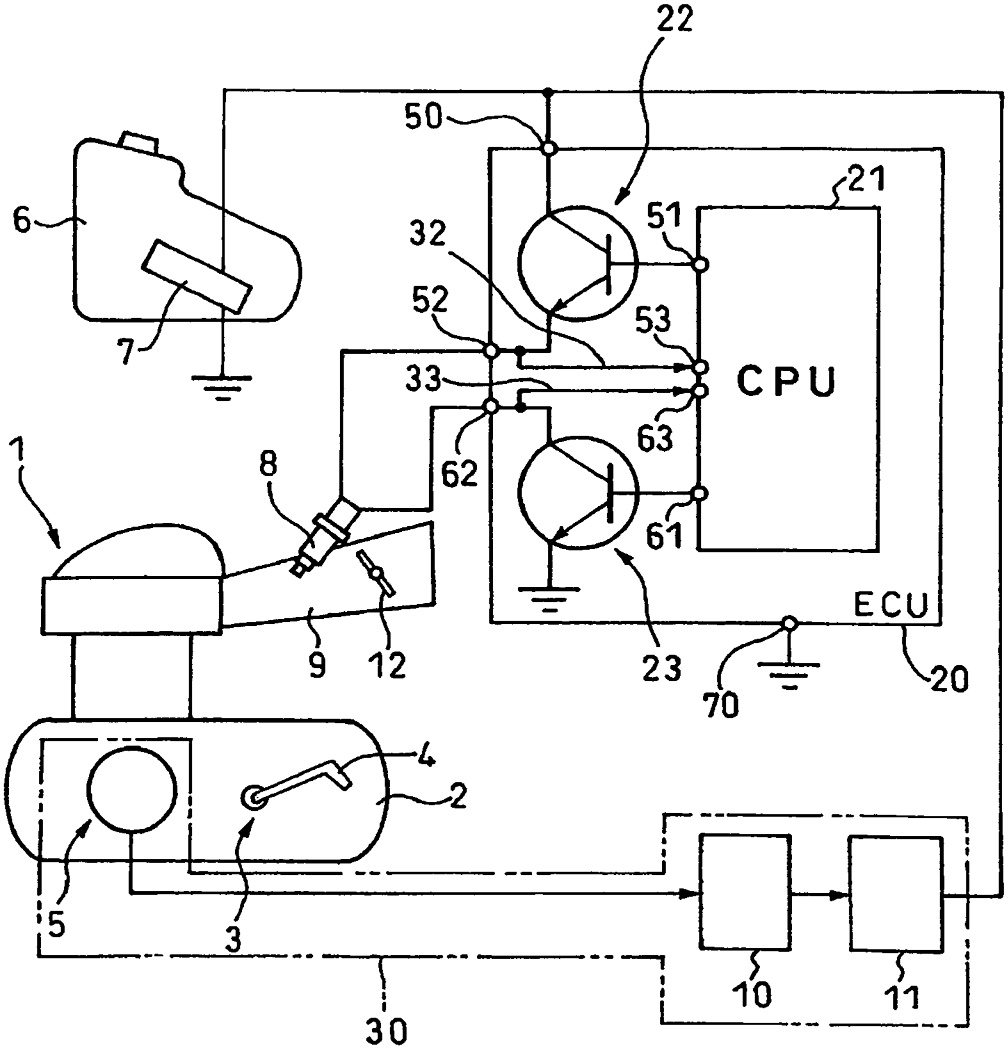
FIG. 1 is a block diagram showing a configuration of an engine having a fuel injection control apparatus according to an illustrative embodiment of the present invention.

Hereinafter, an illustrative embodiment of the present invention is explained in detail in conjunction with drawings. FIG. 1 is a block diagram showing a configuration of an engine having a fuel injection control apparatus according to an illustrative embodiment of the present invention, and a constitution of equipment relating to the motorcycle-use engine.

An engine 1 is a 4-cycle single-cylinder internal combustion engine having an intake/exhaust valve mechanism. The engine 1 includes a kick starter 3, which is used as a starting device operated manually by a person, for rotating a crankshaft (not shown). The kick starter 3 is configured to rotate the crankshaft one or more times by stepping down on a kick pedal 4 which projects outside of a crankcase 2.

Further, the engine 1 is a battery-less type engine. That is, the engine 1 does not include a vehicle-mounted battery or an external battery source. Hence, for example, even when the engine is brought into a startable state by turning on an ignition switch or the like, electricity is not supplied to various electric components unless an AC generator 5 is operated by rotating the kick starter 3 using the kick pedal 4.

An injector 8 and a throttle valve 12 are mounted on an intake pipe 9 of the engine 1. The injector 8 includes a fuel injection valve for injecting fuel fed from a fuel tank 6, under pressure using a fuel pump 7, at predetermined timings. The throttle valve 12 changes a cross-sectional area of the intake pipe 9.

The AC generator 5 is an alternating current generator. The AC generator is mounted on an end portion of the crankshaft. The electricity generated by the AC generator 5 is stored in a capacitor 11. The electricity is supplied to the fuel pump 7, an engine control unit (ECU) 20 and the like, at a predetermined voltage (e.g., 5V) via a regulator 10.

The ECU 20 includes an engine control device operable function with the supply of a predetermined starting power source voltage from the capacitor 11. The ECU 20 controls the injector 8 in response to an output signal from a crank rotational position sensor (not shown), a throttle opening sensor (not shown) or the like.

The injector 8 includes an electromagnetic valve (not shown) configured to open only during a period in which the electricity is supplied to the injector 8 and to remain closed when the supply of electricity to the injector 8 is interrupted.

In the illustrative embodiment, a power source 30 of the motorcycle includes the AC generator 5, the regulator 10 and the capacitor 11.

The ECU 20 includes a central processing unit (CPU) 21. The CPU 21 controls the injector 8, a high-side driver 22 and a low-side driver 23. The high-side driver 22 is arranged electrically upstream of the injector 8, that is, on a power source side. The low-side driver 23 is arranged electrically downstream of the injector 8, that is, on a ground side. Each of the high-side and low-side drivers 22, 23 is formed of a transistor.

Further, the ECU 20 is provided with a power source terminal 50, a ground terminal 70, an output terminal 52 for an electric current which passes the high-side driver 22, and an input terminal 62 for receiving an electric current which passes the injector 8.

The CPU 21 includes an operation processing device having a high-side drive signal port 51 which outputs a drive signal to the high-side driver 22, and a low-side drive signal port 61 which outputs a drive signal to the low-side driver 23.

A high-side return signal detection circuit (also referred as a high-side return signal detection unit) 32 which transmits a return signal to the CPU 21 is arranged between the high-side driver 22 and the output terminal 52. That is, the high-side return signal detection unit 32 is arranged between downstream of the high-side driver 22 and upstream of the injector 8.

A low-side return signal detection circuit (also referred as a low-side return signal detection unit) 33 which transmits a return signal to the CPU 21 is arranged between the input terminal 62 and the low-side driver 23. That is, the low-side return signal detection unit 33 is arranged between upstream of the low-side driver 23 and downstream of the injector 8.

The CPU 21 includes a high-side return signal input port 53 and a low-side return signal input port 63. The high-side return signal input port 53 receives a return signal from the high-side return signal detection unit 32, and inputs the received return signal to the CPU 21. The low-side return signal input port 63 receives a return signal from the low-side return signal detection unit 33, and inputs the received signal to the CPU 21.

During an operation of the engine 1, in response to a drive signal through the high-side drive signal port 51, the CPU 21 holds the high-side driver 22 in an ON state and allows the output terminal 52 to generate a voltage. Further, the CPU 21 repeats an ON-OFF operation of the low-side driver 23 in response to the drive signal through the low-side drive signal port 61 so as to operate the injector 8 to inject fuel intermittently.

In the engine 1 of the illustrative embodiment, the fuel pump 7 is directly electrically connected with the driving power source. Hence, when a short-circuit occurs downstream of the injector 8 in an injector drive-system circuit, there exists a possibility that the supply of electricity to the injector 8 is continued. However, when the CPU 21 detects an occurrence of the short-circuit, since the fuel injection control apparatus includes the high-side driver 22 which is driven in response to a signal from the CPU 21, the supply of electricity to the injector 8 is stopped by changing over the high-side driver 22 to an OFF state, thus interrupting the injection of fuel.

The occurrence of the short-circuit can be detected in such a manner that, for example, a voltage level of the input terminal 62 exhibits a high level or the like during a period of normal engine operation, when voltage level of the input terminal 62 is expected to be at a low level during normal engine operation.

Further, the fuel injection control apparatus of the illustrative embodiment does not include a relay switch, or the like having a mechanical drive component, in a power source supply path to the injector 8. Accordingly, even when an electricity supply time from the AC generator is limited due to starting of the engine by rotating the crankshaft by operating the kick start 3 in the battery-less vehicle, there is no possibility that the supply of electricity to the injector 8 is delayed due to the interposition of the relay switch or the like. Therefore, such configuration of the fuel injection control apparatus of the present invention enhances the startability of the engine 1.

Further, the fuel injection control apparatus of the illustrative embodiment is operable to perform a diagnosis of functions of the high-side driver 22 and the injector 8 by respectively detecting the return signals from the high-side return signal detection unit 32 and the low-side return signal detection unit 33 under predetermined conditions. Hereinafter, a method of the diagnosis of functions is explained in conjunction with a flowchart shown in FIG. 2.

Figure 2:
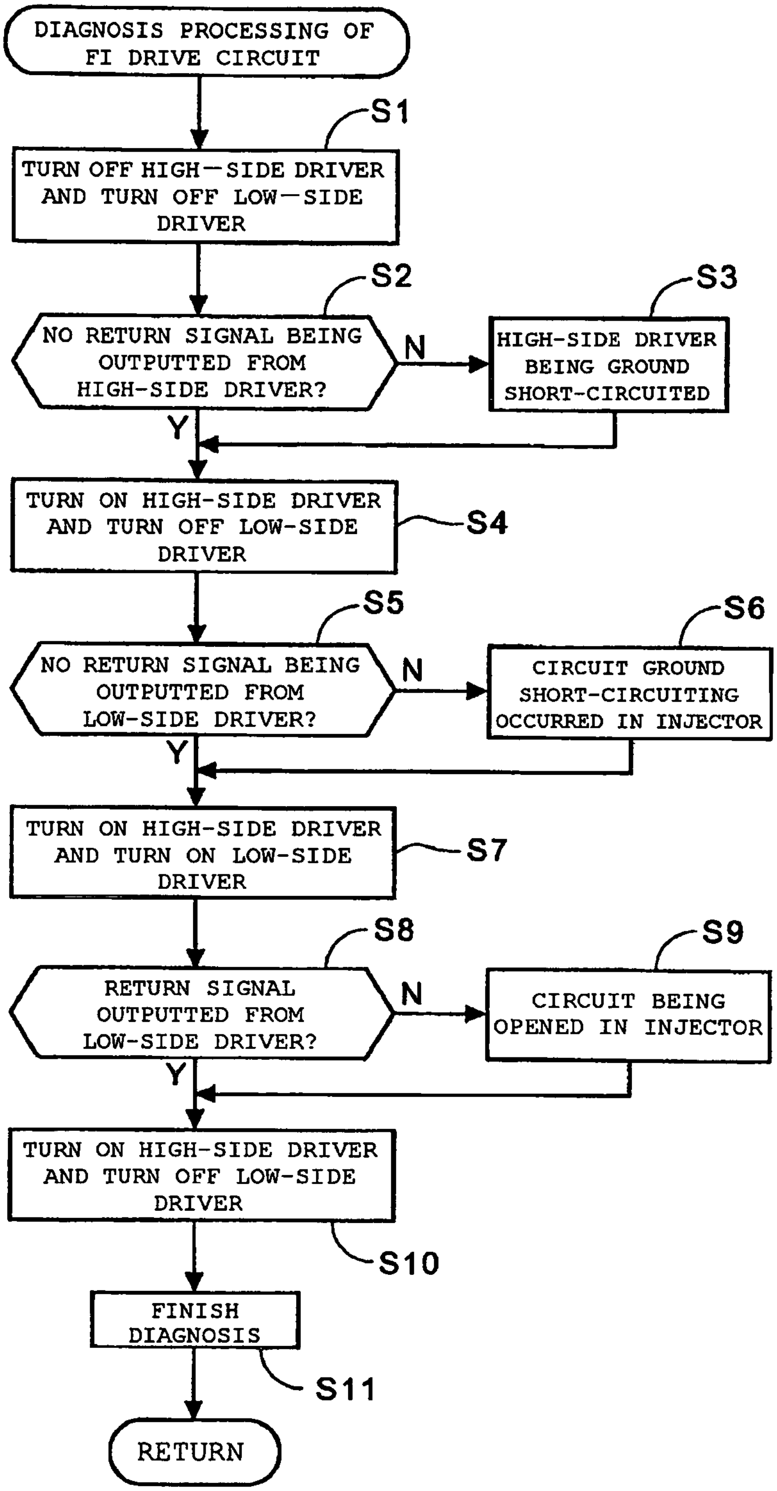
FIG. 2 is a flowchart showing a flow of diagnosis processing of a fuel injection (FI) drive circuit.

FIG. 2 is a flowchart showing method steps of diagnosis processing of an FI (fuel injection apparatus) drive circuit. The diagnosis processing of the FI drive circuit is executed by the CPU 21. The CPU 21 is configured to continuously execute a high-side driver diagnosis, a diagnosis of a ground short-circuit state and a diagnosis of an open state of an internal circuit of the injector 8. The diagnosis of functions is generally executed at the time of starting the engine 1.

First of all, in step S1, the high-side driver 22 and the low-side driver 23 are turned off. In succeeding step S2, the presence or non-presence of a return signal from the high-side driver 22 is determined. When the return signal is not outputted from the high-side driver 22, it is determined that the high-side driver 22 is functioning in a normal manner, and the processing advances to step S4.

On the other hand, when the determination in step S2 is negative, that is, when a return signal from the high-side driver 22 is detected, it is considered that the return signal is inputted to the CPU 21 from the high-side return signal detection unit 32 in spite of the fact that the high-side driver 22 is in an OFF state. Accordingly, the processing advances to step S3, where it is determined that the high-side driver 22 is in a ground short-circuited state, in which a short-circuit occurs in the high-side driver 22 due to some reasons. In the illustrative embodiment, a voltage of a return signal is set to a magnitude of approximately 5V compared to a power source voltage of 12V.

Next, in step S4, the high-side driver 22 is turned on, and at the same time, the low-side driver 23 is turned off, and the processing advances to step S5. In step S5, the presence or non-presence (absence) of the return signal from the low-side driver 23 is determined. When the return signal is not outputted from the low-side driver 23, it is determined that no ground short-circuit is occurring inside the injector 8, and the processing advances to step S7.

On the other hand, when the determination in step S5 is negative, that is, when the return signal from the low-side driver 23 is detected, a current which passes through the injector 8 is inputted to the low-side driver 23 from the input terminal 62 in spite of a fact that the low-side driver 23 is in an OFF state. Accordingly, the processing advances to step S6 where it is determined that a ground short-circuit has occurred inside the injector 8.

Further, in step S7, the high-side driver 22 and the low-side driver 23 are turned on, and the processing advances to step S8. In step S8, the presence or non-presence (absence) of the return signal from the low-side driver 23 is determined. When a return signal is outputted from the low-side driver 23, it is determined that the internal circuit of the injector 8 is not held in an open state which is caused by sticking or the like, and the processing advances to step S10.

On the other hand, when the determination in step S8 is negative, that is, when a return signal from the low-side driver 23 is detected, it is considered that a current does not pass through the injector 8 in spite of a fact that the low-side driver 23 is in an ON state. Accordingly, the processing advances to step S9 where it is determined that the internal circuit of the injector 8 is in an open state.

Further, in step S10, the diagnosis processing of the FI drive circuit is returned to a standby state in which the high-side driver 22 is turned on and the low-side driver 23 is turned off. In step S11, a series of the diagnosis processing of the FI drive circuit is finished.

Here, when it is diagnosed that the high-side driver 22 and the injector 8 are not operating (functioning) in a normal manner based on the determinations in respective steps S2, S5 and S8, it is possible to inhibit the starting of the engine 1 using the ECU 20 or to display a diagnosis result on an indicator (not shown).

FIG. 3 is a table showing an output state of the return signals when all of results of the respective diagnoses in the diagnosis processing of the FI drive circuit explained in conjunction with the flowchart shown in FIG. 2 are normal.

As described above, in the illustrative embodiment, the fuel injection control apparatus is configured to continuously perform: (1) high-side driver diagnosis (the presence or non-presence of the ground short-circuited state of the high-side driver), (2) injector internal circuit diagnosis A (the presence or non-presence of the ground short-circuited state in the injector), and (3) injector internal circuit diagnosis B (the presence or non-presence of the open state in the injector).

These diagnoses of functions are performed by detecting the presence or non-presence of the return signal in response to the driving state of both the transistors. Hence, it is possible to perform these diagnoses of functions in a short perios of time at the time of starting the engine. Here, a state of the return signal, indicted within parenthesis in the table shown in FIG. 3, is used as a factor for the determination of the above-mentioned diagnosis results of functions.

As described above, according to the fuel injection control apparatus of the present invention, the high-side driver driven by the CPU is arranged electrically upstream of the injector. Hence, in the circuit which drives the injector using the low-side driver arranged electrically downstream of the injector, even when a short-circuit occurs in the injector drive-system circuit, it is possible to interrupt the supply of electricity to the injector by turning off the high-side driver.

Further, it is possible to shorten the time necessary for supplying electricity to the injector compared to a configuration in which a relay switch or the like is provided in the power source supply system for having a fail-safe function against the above-mentioned short-circuit of the injector. Accordingly, even when the fail-safe function is applied to the battery-less vehicle which supplies electricity generated by the AC generator to the injector at the time of starting the engine, it is possible to prevent the lowering of the startability of the engine.

Here, the respective configurations of the engine, and the ECU, the respective states of the high-side driver and the low-side driver, the order of the respective diagnoses of functions of the high-side driver and the injector and the like are not limited to the above-mentioned illustrative embodiment, and various modifications are conceivable.

For example, the fuel injection control apparatus according to the present invention is applicable to various kinds of engines including a vehicle-use engine, a generator-use engine and the like. Further, the engine is not limited to an engine of the motorcycle, and the engine can be mounted on various kinds of vehicles including a three-wheeled vehicle and a four-wheeled vehicle.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A method of diagnosing a fuel injection control apparatus, said fuel injection control apparatus comprising a low-side driver arranged electrically downstream of an injector, and is configured to operate the injector with a changeover of an ON-OFF state thereof in response to a drive signal received from a central processing unit (CPU); and a high-side driver arranged electrically upstream of the injector and downstream of a power source terminal, said high-side driver configured to change over an ON-OFF state thereof in response to the drive signal from the CPU; said method comprising the steps of:

supplying electricity that is generated by an AC generator driven by a kick starter and subsequently driven by an engine after starting of the engine, stored in a capacitor, and regulated at a predetermined voltage via a regulator to a fuel pump and the power source terminal:

turning-off a high-side driver and a low-side driver;

determining whether or not a return signal from the high-side driver is present when both the high-side driver and the low-side driver are turned off;

when an absence of the return signal from the high-side driver is detected while both the high-side driver and the low-side driver are turned off, diagnosing that the high-side driver is functioning in a normal manner;

turning on the high-side driver while leaving the low-side driver turned off;

determining whether a return signal from the low-side driver is present or not when the high-side driver is turned on and the low-side driver is turned off;

when an absence of the return signal from the low-side driver is detected while the high-side driver is turned on and the low-side driver is turned off, diagnosing that an internal circuit of the injector is not in a ground-short-circuited state;

turning on both the high-side driver and the low-side driver;

determining whether a return signal from the low-side driver is present or not when both the high-side driver and the low-side driver are turned on;

when a presence of the return signal from the low-side driver is detected while both the high-side driver and the low-side driver are turned on, diagnosing that the internal circuit of the injector is not in an open state; and when an absence of the return signal from the low-side driver is detected while both the high-side driver and the low-side driver are turned on, diagnosing that the internal circuit of the injector is in an open state:

wherein the low-side driver is arranged electrically downstream of the injector;

wherein the high-side driver is arranged electrically upstream of the injector and downstream of the power source, and wherein each of the low-side driver and the high-side driver, respectively, comprises a transistor.

2. A method of diagnosing a fuel injection control apparatus according to claim 1, further comprising the step of, when a presence of the return signal from the high-side driver is detected while both the high-side driver and the low-side driver are turned off, diagnosing an occurrence of a ground short-circuit in the high-side driver.

3. A method of diagnosing a fuel injection control apparatus according to claim 1, further comprising the step of, when a presence of the return signal from the low-side driver is detected while the high-side driver is turned on and the low-side driver is turned off, diagnosing that an internal circuit of the injector is in a ground-short-circuited state.

* * * * *